United States Patent
Aibester et al.

(10) Patent No.: US 10,938,720 B2
(45) Date of Patent: Mar. 2, 2021

(54) NETWORK ELEMENT WITH IMPROVED CACHE FLUSHING

(71) Applicant: MELLANOX TECHNOLOGIES TLV LTD., Raanana (IL)

(72) Inventors: Niv Aibester, Herzliya (IL); Gil Levy, Hod Hasharon (IL); Nir Monovich, Hod Hasharon (IL)

(73) Assignee: MELLANOX TECHNOLOGIES TLV LTD., Raanana (IL)

(*) Notice: Subject to any disclaimer, the term of this patent is extended or adjusted under 35 U.S.C. 154(b) by 0 days.

(21) Appl. No.: 16/420,217

(22) Filed: May 23, 2019

(65) Prior Publication Data

US 2020/0374230 A1 Nov. 26, 2020

(51) Int. Cl.
*H04L 12/747* (2013.01)
*H04L 12/741* (2013.01)

(52) U.S. Cl.
CPC .......... *H04L 45/742* (2013.01); *H04L 45/745* (2013.01)

(58) Field of Classification Search
CPC ............................ H04L 45/742; H04L 45/745
See application file for complete search history.

(56) References Cited

U.S. PATENT DOCUMENTS

| 6,018,763 | A | 1/2000 | Hughes et al. |
| 6,947,971 | B1 | 9/2005 | Amos |
| 9,189,413 | B2 * | 11/2015 | McKenney ......... G06F 12/0891 |
| 2003/0154301 | A1 * | 8/2003 | McEachern ............ H04L 45/16 709/237 |
| 2014/0071778 | A1 * | 3/2014 | Coteus ................ G06F 13/1668 365/222 |

* cited by examiner

*Primary Examiner* — Kevin C. Harper
*Assistant Examiner* — Henry Baron
(74) *Attorney, Agent, or Firm* — Kligler & Associates Patent Attorneys Ltd (57) ABSTRACT

A network element includes multiple ports, a memory, multiple processors and cache-flushing circuitry. The multiple ports are configured to serve as ingress and egress ports for receiving and transmitting packets from and to a network. The memory is configured to store a forwarding table including rules that specify forwarding of the packets from the ingress ports to the egress ports. The multiple processors are configured to process the packets in accordance with the rules. The two or more cache memories are each configured to cache a respective copy of one or more of the rules, for use by the multiple processors. The cache-flushing circuitry is configured to trigger flushing operations of copies of rules in the cache memories in response to changes in the forwarding table, and to reduce a likelihood of simultaneous accesses to the forwarding table for updating multiple cache memories, by de-correlating or diluting the flushing operations.

12 Claims, 5 Drawing Sheets

NETWORK ELEMENT WITH IMPROVED CACHE FLUSHING

FIELD OF THE INVENTION

The present invention relates generally to communication networks, and particularly to the efficient use of cache memories in network elements.

BACKGROUND OF THE INVENTION

In communication networks, forwarding tables may be used to specify how packets that enter a network node are forwarded. For faster operation, one or more cache memories are sometimes employed.

U.S. Pat. No. 6,018,763 describes a device, which performs bridging, routing and gateway services, based on the concept of a shared memory, which is optimized for transfers of I/O data from network interface devices.

U.S. Pat. No. 6,947,971 describes caching information associated with packets in an Ethernet packet header cache.

SUMMARY OF THE INVENTION

An embodiment of the present invention that is described herein provides a network element including multiple ports, a memory, multiple processors and cache-flushing circuitry. The multiple ports are configured to serve as ingress and egress ports for receiving and transmitting packets from and to a network. The memory is configured to store a forwarding table including rules that specify forwarding of the packets from the ingress ports to the egress ports. The multiple processors are configured to process the packets in accordance with the rules. The two or more cache memories are each configured to cache a respective copy of one or more of the rules, for use by the multiple processors. The cache-flushing circuitry is configured to trigger flushing operations of copies of rules in the cache memories in response to changes in the forwarding table, and to reduce a likelihood of simultaneous accesses to the forwarding table for updating multiple cache memories, by de-correlating or diluting the flushing operations.

In some embodiments, the cache-flushing circuitry is configured to de-correlate the flushing operations by applying the flushing operations at a rate that does not exceed a predefined rate threshold. In other embodiments, the cache-flushing circuitry is configured to de-correlate the flushing operations by enforcing at least a predefined time interval between successive flushing operations. In yet other embodiments, the cache-flushing circuitry is configured to dilute the flushing operations by identifying one or more packet flows affected the changes in the forwarding table, and flushing only copies of rules that pertain to the affected packet flows.

There is additionally provided, in accordance with an embodiment of the present invention, a method including, in a network element, receiving and transmitting packets from and to a network using multiple ports that serve as ingress and egress ports. A forwarding table including rules, which specify forwarding of the packets from the ingress ports to the egress ports, is stored in a memory. The packets are processed by multiple processors of the network element, in accordance with the rules. A respective copy of one or more of the rules is cached in each of two or more cache memories, for use by the multiple processors. Flushing operations, of copies of rules in the cache memories, are triggered in response to changes in the forwarding table. A likelihood of simultaneous accesses to the forwarding table for updating multiple cache memories is reduced, by de-correlating or diluting the flushing operations.

The present invention will be more fully understood from the following detailed description of the embodiments thereof, taken together with the drawings in which:

DETAILED DESCRIPTION OF EMBODIMENTS

Overview

Network switches receive packets from ingress ports and forward the packets to egress ports. A network switch typically comprises a Forwarding Table, which defines forwarding rules according to characteristics of the input packet headers (e.g., according to the packet's 5-tuple-source address, destination address, input port, output port and protocol-in-use).

Embodiments of the present invention that are described herein provide improved network elements and associated methods. In particular, the disclosed techniques efficiently manage local caching of forwarding-table entries. In some embodiments, a network element, e.g., a network switch or router, comprises a plurality of concurrent processing circuits, wherein each processing circuit processes incoming packets from a subset of the ingress ports (for example, one processor for each ingress port). We will refer hereinbelow to processing circuits of ingress packets as Ingress Processors.

In some embodiments, the network element comprises a shared, global forwarding table that is accessed by the various ingress processors. Performance bottlenecks may occur when multiple Ingress Processors access the shared forwarding table. In order to mitigate such performance bottlenecks, the ingress processors comprise cache memories, which store copies of entries from the forwarding table (e.g., the forwarding actions that the ingress processor should exercise).

In some embodiments, a cache memory may be associated with every ingress processor, or with a group of ingress processors. If each ingress processor comprises a cache memory, the ingress processor may be able to process the majority of ingress packets locally (that is, according to entries stored in the local cache), and access the shared forwarding table only when the information which the ingress processor requires to process an input packet is not found in the cache (i.e.—in case of a "cache miss").

Caching, however, comes at a price—the local caches must be maintained and updated, so that coherency with the forwarding table will be preserved. When the forwarding table changes (e.g., by introducing new forwarding rules, or modifying or invalidating existing rules), the local caches must be updated as well.

One possible way to assure cache coherency is invalidating ("flushing") all caches whenever the forwarding table changes. This algorithm, however, may result in severe bottlenecks, since, following the flush, the first cache accesses of all ingress processors, associated with the processing of new input packets, will result in an "entry-not found" ("miss"). Consequently, all ingress processors will attempt to access the shared forwarding table simultaneously. As a result, while the ingress processors may support high bandwidth with low latency as long as the forwarding table does not change, long latency periods (which sometimes may lead to packet dropping) may occur whenever the forwarding table changes. In addition, when the cache is flushed, performance is typically severely degraded while the cache "re-learns" the frequently-used forwarding rules.

Another possible method that could be used is to propagate any change in the forwarding table to all caches which have a copy of the changed data. This algorithm, too, may result in performance bottlenecks, as the changed entries must be checked in all caches.

Embodiments according to the present invention provide improved techniques to assure cache coherency, with low cost in performance and/or latency. According to some embodiments of the present invention, when the forwarding table changes, each ingress processor starts a process of gradual cache flush, wherein the cache entries are invalidated gradually over a time period. (In the context of the present disclosure, gradual cache flush will mean flushing of the cache at a rate which is deliberately slowed down; for example, by pausing for a preset time between the flushing of cache entries).

This mode of operation causes de-correlation in time between cache flush operations, and therefore also de-correlates access to the forwarding table by different ingress processors. Thus, after the forwarding table changes, the ingress processors will access the forwarding table for new entries over some time, and the bottleneck associated with many ingress processors accessing the table at the same time will be avoided.

In other embodiments according to the present invention, the ingress processors have flow-based flushing capabilities. (The term "flow" in the context of the present disclosure refers to a sequence of packets, for which a predefined set of header field values have the same values, for example a group of packets that have a common source and destination address. The packets in a flow are typically processed using the same subset of rules in the forwarding table.) Flows may define lookup tables rather than (or in addition to) table values. For example, if IP, ECMP Entries were changed—all cache entries that do not pertain to IP/ECMP will not be flushed. If the forwarding table updates rules pertaining to a flow of packets or a group of flows, only cache entries that correspond to the affected flows will be invalidated. Thus, the performance of flows which were not affected by the change in the forwarding table will remain unchanged. As a result, cache flush operations are diluted. Bottlenecks that occur when a plurality of ingress processors access the forwarding table following change of rules, will be mitigated, as fewer ingress processors will need to access the table.

In summary, according to embodiments of the present invention that are presented herein, a network element comprises a plurality of ingress processors that process ingress packets at high throughput and with low latency. The ingress processors read forwarding rules mostly from local cache memories that store copies of entries of a shared forwarding table. When rules in the shared forwarding table change, the cache memories are invalidated selectively, corresponding to flows affected by the changed rules, and/or gradually, over a period of time. Performance loss by cache misses, as well as bottlenecks associated with simultaneous accessing of a shared forwarding table, are thus mitigated.

System Description

Figure 1:
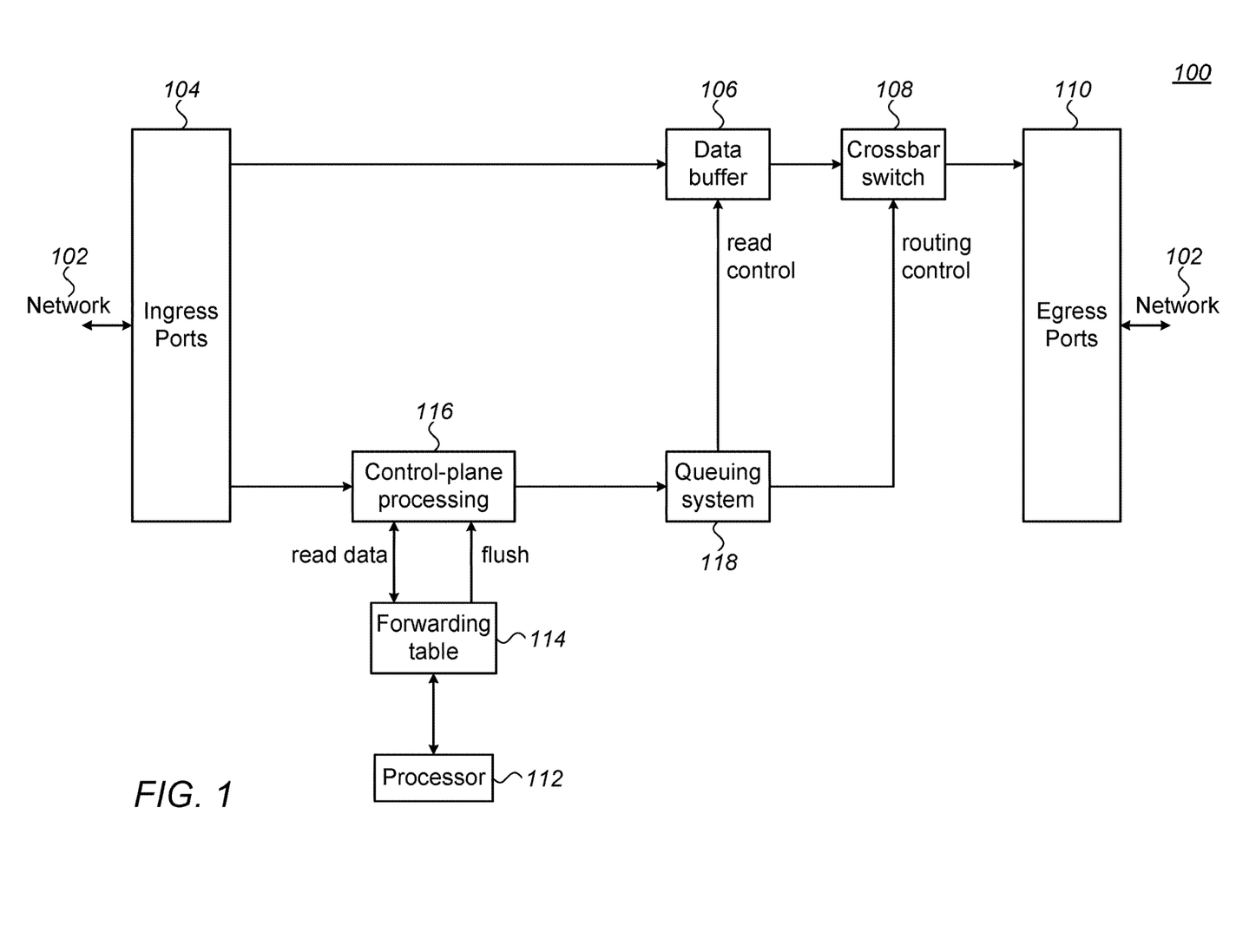
FIG. 1 is a block diagram that schematically illustrates a network switch, in accordance with embodiments of the present invention.

FIG. 1 is a block diagram that schematically illustrates a network switch 100, in accordance with embodiments of the present invention. Network switch 100 may operate in accordance with any suitable network protocol, e.g., Ethernet or Infiniband. The network switch receives and sends packet from/to network 102. Ingress packets enter an Ingress Ports unit 104, which forwards the packets to a Data Buffer 106. The network switch then forwards packets that are stored in Data Buffer 106, through a Crossbar Switch 108, to an Egress Ports unit 110, which outputs the packets to the network.

Packet flow from the ingress ports to the egress ports, through the data buffer and the crossbar switch, will be referred to as Packets Data-Path, and the corresponding units—Data Buffer 106 and Crossbar Switch 108, will be referred to as the Data Plane.

Network Switch 100 further comprises a Processor 112, which governs the operation of the network switch; a Forwarding Table 114, which comprises packet forwarding rules (and may comprise circuitry that indicates when entries in the table are changed); a Control-Plane Processing 116; and a Queuing System 118. The Forwarding Table, Control-Plane and Queuing System, control packet transfer in the Network Switch and will be collectively referred to as the Control Plane. Forwarding Table 114 is stored in a suitable memory of Network Switch 100, e.g., in RAM.

Processor 112 writes forwarding rules in Forwarding Table 114 and may update the rules from time to time. Control-Plane Processing unit 116 accesses the Forwarding Table to get forwarding rules for packets that the control-plane processing processes. The Control Plane Processing Unit then sends routing information for the processed packets to Queuing-System 118, which comprises a queue for packets that the network switch should output. Queuing-System 118 controls reading of packets from Data Buffer 106 to Crossbar Switch 108 and forwarding of packets through Crossbar Switch 108 to the Egress Ports.

In embodiments according to the present invention, for faster access, the Control-Plane Processing unit comprises local copies of at least a portion of the forwarding table; hence, when the processor updates the forwarding table, the processor sends a Flush signal to the control-plane processing, to indicate that data in the local copies may not be valid, and the Control-Plane Processing unit must re-access the forwarding table to get new rules.

When, following a Flush of all local copies of the forwarding table, the Control-Plane Processing unit proceeds to process further packets, the Control-Plane Processing unit may need to re-access the forwarding table for a plurality of flushed forwarding rules, and access bottlenecks may occur.

In embodiments according to the present invention, flushing of local copies of the forwarding table is done selectively and/or progressively, mitigating bottlenecks when the control-plane re-access the forwarding table.

As would be appreciated, the structure of Network Switch 100 described above is cited by way of example. Network Switches in accordance to the disclosed techniques are not limited to the description hereinabove. In alternative embodiments, for example, there may be more than one processor; there may be a plurality of forwarding tables, or there may be forwarding tables with indirect accessing (an example to a table with indirect accessing will be described hereinbelow); there may be some ports which are both Ingress and Egress; and, the Crossbar Switch may be replaced by a bus. Moreover, in some embodiments, the network switch may be a server, or a router.

Figure 2:
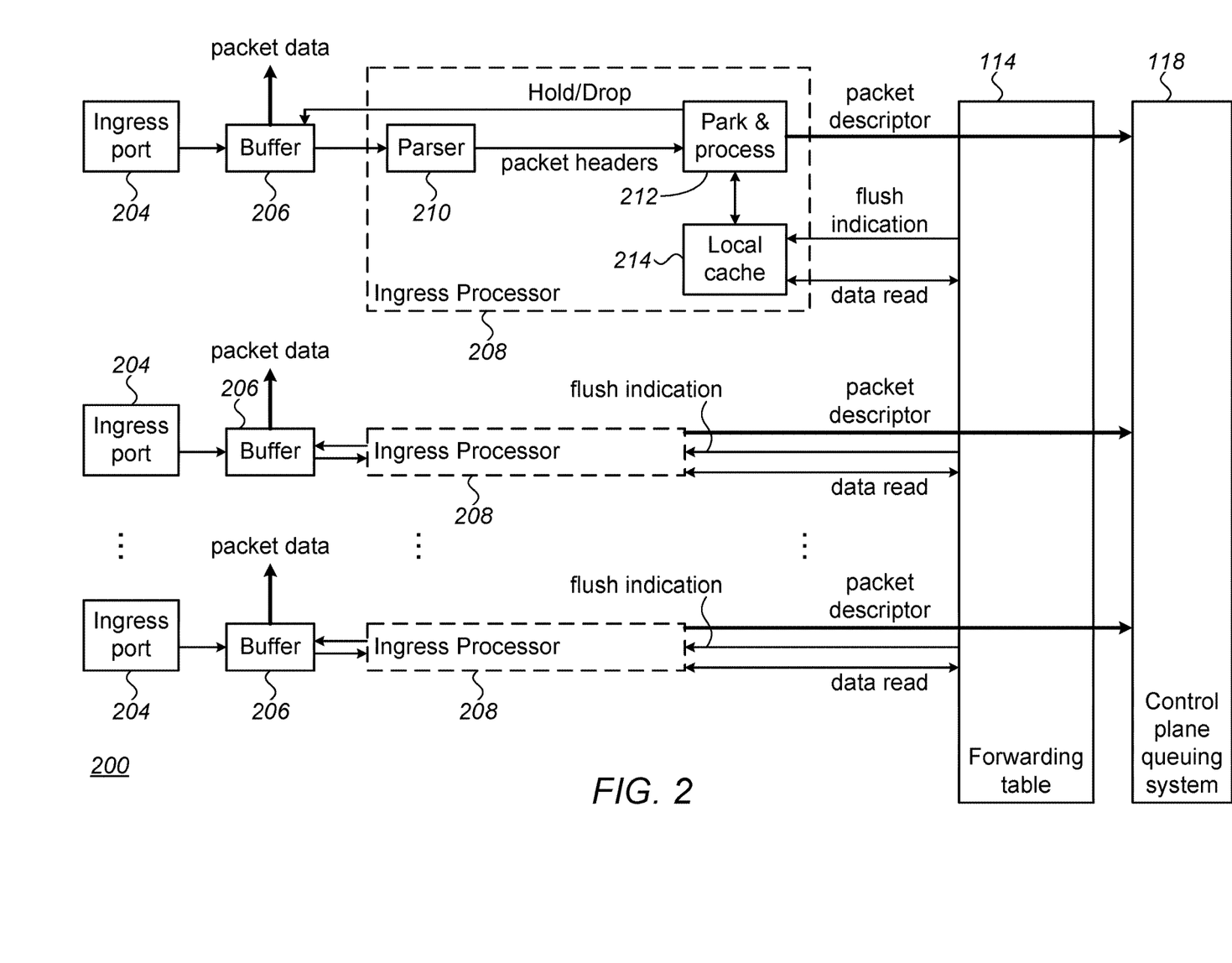
FIG. 2 is a block diagram that schematically illustrates a control plane in a network switch, in accordance with an embodiment of the present invention.

FIG. 2 is a block diagram that schematically illustrates a Control Plane 200 of a network switch, e.g., of switch 100 of FIG. 1, in accordance with an embodiment of the present invention. The Control Plane comprises Ingress Ports 204, which receive packets from the network; Buffer 206, which stores packets that the Ingress Ports receive; and, Ingress Processors 208.

Buffer 206 may be a shared buffer for all Ingress ports, or a distributed buffer, coupled to individual Ingress Ports or groups of Ingress Ports.

Each Ingress Processor 208 comprises a Parser 210, a Park-and-Process unit 212, and, a Flow-Based Local-Cache 214. Parser 210 receives packets from Buffer 206, extracts the packets headers from the packets, and sends the packet headers to Park and Process 212 (data that the parser sends to the Park and Process is referred to herewith as "packet header", although data encoding may be different than the encoding of the packet header, and although the data may comprise additional packet-classifying information).

Park and Process 212 receives the packets headers from the parser and sends packet descriptors (which comprise routing/forwarding and other packet information) to a Control-Plane Queuing System 118 (FIG. 1). Park and Process 212 also signals to Buffer 206 when it is not ready ("hold"), in which case the buffer will stop sending new packet headers to the parser; and when the packet that the Park & Process processes is to be dropped, in which case a buffer read-pointer (not shown) will increment, so that the next header that the Parser will extract will correspond to the next packet.

To process the packet headers, Park and Process 212 reads forwarding rules from a Flow-Based Local-Cache 214, which is configured to store copies of forwarding rules from Forwarding Table 114. When a requested forwarding rule is not present in the Local-cache, the Local-Cache loads a copy of the rule from Forwarding Table 114 and returns the rule to the Park and Process unit.

When processor 112 (FIG. 1) changes the forwarding table, the forwarding table indicates that local caches should be flushed. In the example embodiment illustrated in FIG. 2, the Flush indication is output from Forwarding Table 114; in alternative embodiments, the indication may be generated by other control-plane circuits, or by the processor (the terms Flush and Invalidate are used herein interchangeably).

In embodiments according to the present invention, flushing of local caches is done selectively and/or progressively, mitigating bottlenecks that may occur when local caches of a plurality of Ingress Processors re-access the forwarding table.

As would be appreciated, the structure of Ingress Processor 208 described above is cited by way of example. Ingress Processors in accordance to the disclosed techniques are not limited to the description hereinabove. In alternative embodiments, for example, part of the data buffer may be embedded in the Ingress port; and, the parser may comprise a classifier.

Figure 3:
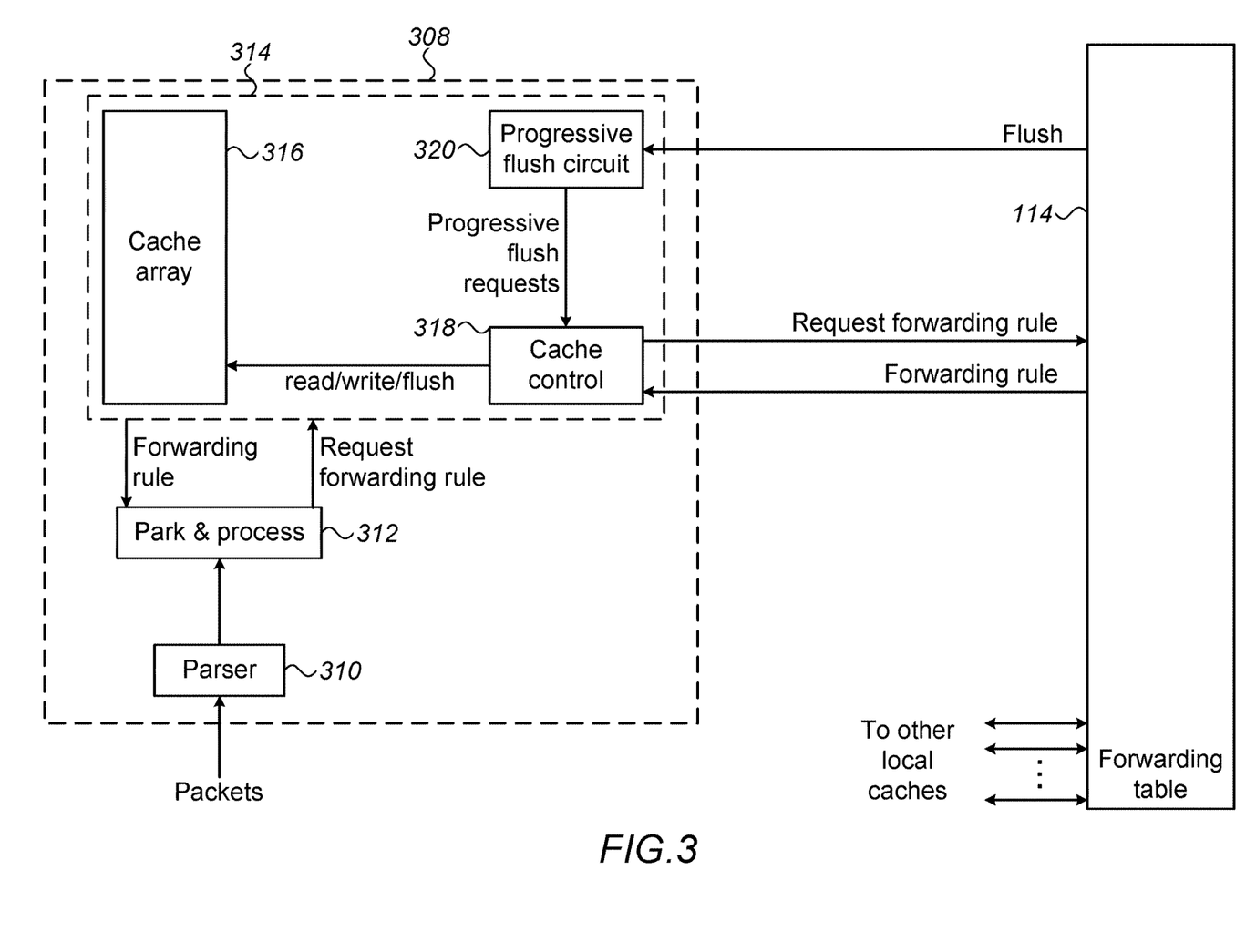
FIG. 3 is a block diagram that schematically illustrates an Ingress Processor having a progressively-flushed local cache, in accordance with an embodiment of the present invention.

FIG. 3 is a block diagram that schematically illustrates an Ingress Processor 308 having a progressively-flushed cache memory, in accordance with an embodiment of the present invention. This configuration can be used, for example, for implementing ingress processors 208 of FIG. 2. Ingress Processor 308 comprises a Parser 310 and a Park and Process 312, which are similar, respectively, to Parser 210 and Park and Process 212 described hereinabove.

Ingress Processor 308 further comprises a Local Cache 314. The local cache comprises a Cache Array 316, a Cache Control 318 and a Progressive Cache Flush Circuit 320, which is configured to request that the cache control unit invalidates cache-array entries. Cache Array 316 stores copies of at least a portion of Forwarding Table 114. To process packet headers, Park and Process unit 312 requests one or more forwarding rules from the local cache. If the requested rule is stored in Cache Array 316, the cache array returns the rule to the Park and Process unit. If the rule is not stored in the Cache Array, the Local Cache accesses the shared Forwarding Table 114, to retrieve the rule, and returns the rule to the Park and Process unit. The retrieved rule may also be stored in the cache array, so that further requests for the same rule will be answered locally.

Rules stored in the forwarding table may occasionally change, and, in this case, copies of the rules that are stored in local caches 316 of the Ingress Processors become invalid. If, following changes in the forwarding table, the local caches of a plurality of ingress processors are invalidated at the same time (or in close proximity to each other), all Ingress Processors with invalid local caches will access the shared Forwarding Table when processing the next packet; and, hence, bottlenecks will occur, which may cause performance degradation, long latencies, and, possibly, dropping of packets.

In the example embodiment of FIG. 3, flushing of the local caches is done progressively. When Ingress Processor 308 receives an indication that the local cache should be flushed, Progressive Flush Circuit 320 begins a cache-flushing process, wherein rules that are stored in the cache array are invalidated gradually, e.g., at a controlled rate that is not permitted to exceed a predefined rate threshold. For example, Progressive-Flash Circuit 320 may request invalidation of sequential cache addresses, from a first address to a last address, with a preset time-interval between sequential invalidation requests.

Thus, according to the example embodiment illustrated in FIG. 3, when rules in the forwarding table change, Local Caches of Ingress Processors will be invalidated progressively over time. The Ingress Processors will then access the forwarding table gradually, and the bottlenecks associated with simultaneous accesses of a shared forwarding table will be mitigated.

As would be appreciated, the structure of the progressively-flushed Local Cache described above is cited by way of example. Progressively-flushed Local Caches in accordance with the disclosed techniques are not limited to the description hereinabove. In alternative embodiments, for example, the Progressive Flush Circuit may be embedded in the Cache Array, the cache array may comprise several cache levels; some or all of the cache arrays may be content-addressable memories (CAM); some entries of the cache may be preserved during the invalidation; the order of the local cache entries that are invalidated may be sequential, random or pseudo-random; and, the time interval between invalidation requests may be randomized.

Figure 4:
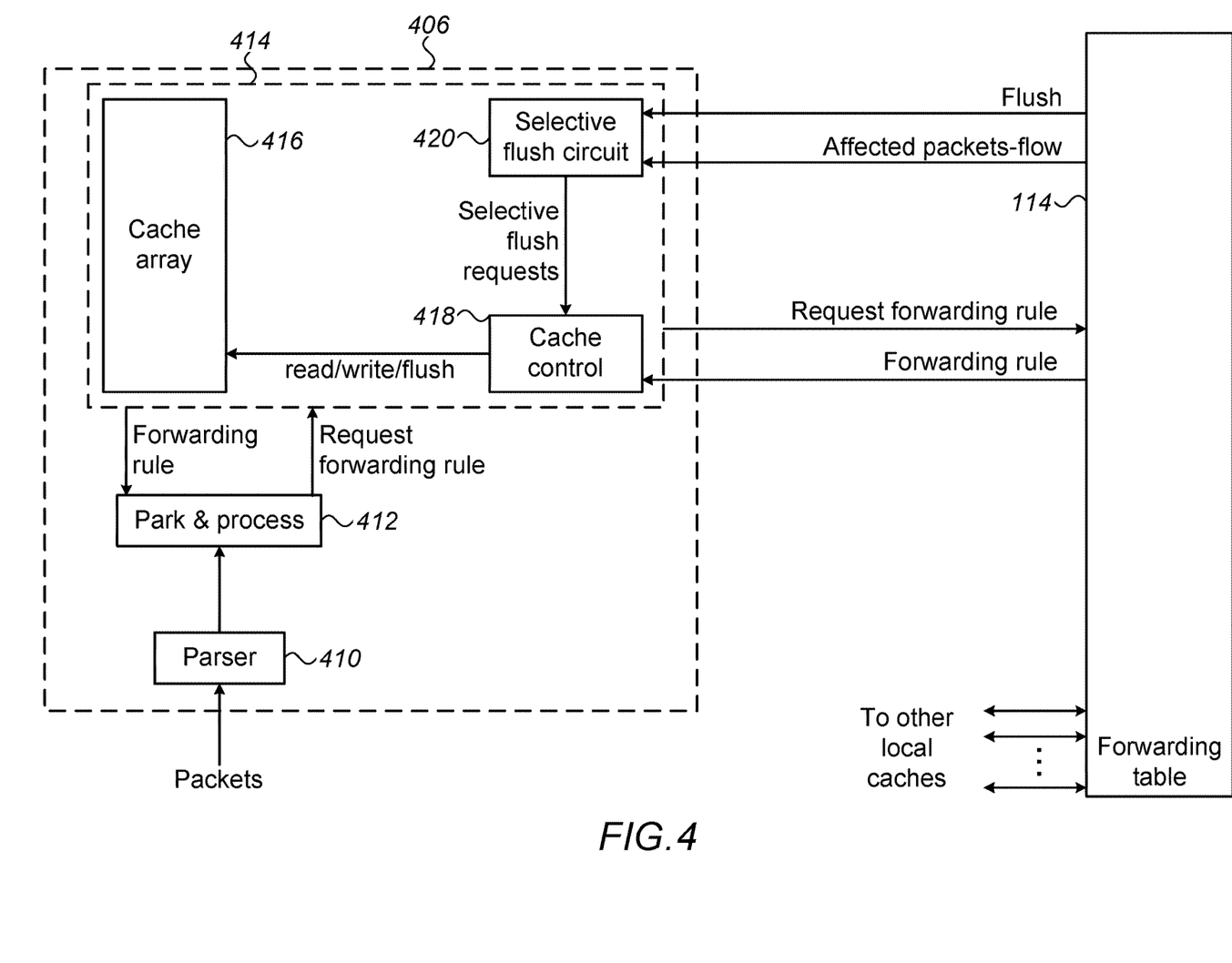
FIG. 4 is a block diagram that schematically illustrates an Ingress Processor having a selectively-flushed local cache, in accordance with an embodiment of the present invention.

FIG. 4 is a block diagram that schematically illustrates an Ingress Processor 406 having a selectively-flushed local cache, in accordance with an embodiment of the present invention. This configuration can be used, for example, for implementing ingress processors 208 of FIG. 2. Ingress Processor 406 comprises a Parser 410 and a Park and Process 412, which are similar, respectively, to Parser 310 and Park and Process 312 described hereinabove; and a Local Cache 414.

Local Cache 414 comprises a Cache Array 416 and Cache Control 418, which are similar, respectively, to Cache Array 316 and Cache Control 318 described hereinabove. Local Cache 414 further comprises a Selective Flush Circuit 420. Cache Control 418 is configured to selectively flush cache array 416, respective to selective flush requests that are output from Selective Flush circuit 420.

Rules that are stored in the forwarding table pertain to flows of packets. According to embodiments of the present invention, ingress processors may refrain from invalidating rules that pertain to flows that are not affected by the change in the forwarding table.

According to the example embodiment illustrated in FIG. 4, when rules in the forwarding table change, the forwarding table indicates the affected flows; local caches will then invalidate entries that pertain to the affected flows only. Rules pertaining to other flows will remain in the cache, and the performance for processing of the other flows will not be affected.

When one or more forwarding rules in Forwarding Table 114 change, Local Cache 414 receives an indication of the affected flow. Selective Flush Circuit 420 will request, through Cache Control 418, flushing of rules from cache array 416, respective to the affected flows; other rules that are stored in the local cache will remain valid.

Thus, according to the example embodiment illustrated in FIG. 4, when rules in the forwarding table change, only rules that pertain to the affected packets flow are invalidated in the local caches and, hence, the performance and latency penalties associated with updating of the forwarding table are mitigated.

As would be appreciated, the structure of the selectively-flushed Local Cache described above is cited by way of example. Selectively-flushed Local Caches in accordance with the disclosed techniques are not limited to the description hereinabove. In alternative embodiments, for example, cache array 416 may comprise a plurality of cache levels. In another example, to further mitigate bottlenecks when the local caches access the forwarding table for new rules, the selective flush circuit may delay the selective flush by a period of time (which may be different for each ingress processor of the network switch; e.g. randomly set).

Figure 5A:
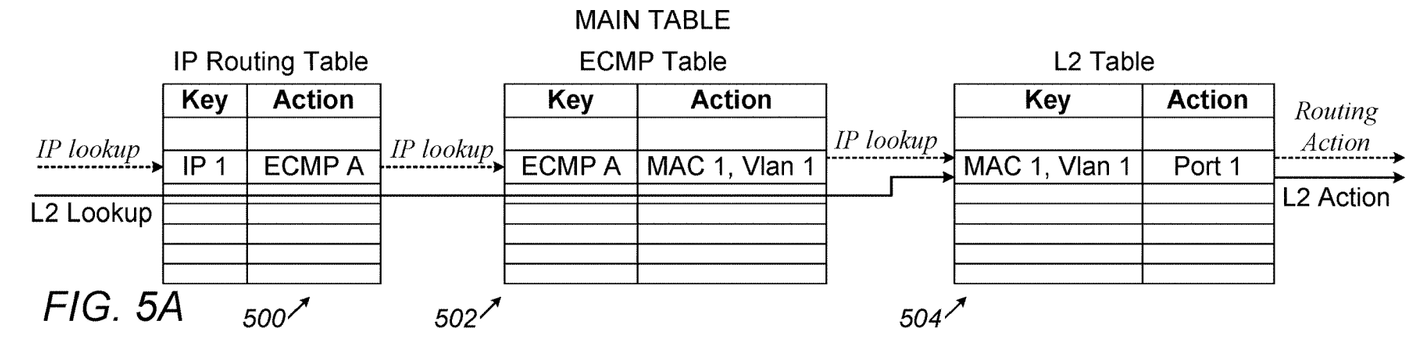
FIG. 5A is a table that schematically describes changed forwarding rule in a forwarding table, in accordance with an embodiment of the present invention.

FIG. 5A is a table that schematically describes a changed forwarding rule in a forwarding table, in accordance with an embodiment of the present invention. The table comprises three partial tables—an IP Routing Table 500, which translates from IP address to an Equal-Cost Multi-Path (ECMP) address; an ECMP table 502, which translates from ECMP addresses to MAC and VLAN numbers, and an L2 table 504, which translates from MAC and VLAN numbers to an egress port.

In the description hereinbelow, { } represent concatenation of fields, and [ ] represent index. For example, a {MAC[1],Vlan[1]} table key is a key comprising the concatenation of the numerical value of the MAC 1 and the numerical value of Vlan 1.

If the MAC/Vlan address is not known (for example, if cache miss occurs for L3 (IP) Lookup), the ingress processor must access the forwarding table with two indirection levels: first, the ingress processor accesses Table 500 with the IP as an input key (IP[1]), and gets ECMP (ECMP[A]); next, the ingress processor accesses ECMP Table 502, with ECMP as an input key, and gets the MAC number (MAC[1]) and the Vlan number (Vlan[1]); lastly, the Ingress Processor accesses L2 Table 504 with a {MAC,Vlan} combination ({MAC[1],Vlan[1]}) as input key, and gets the egress port number (Port[1]) to which the ingress processor should route the packet.

Alternatively, if a cache miss ocuurs for L2 (MAC) lookup, and the {MAC,Vlan} combination is known, the ingress processor can directly access L2 Table 504, with {MAC[1],Vlan[1]} as input key, and get the port number.

Figure 5B:
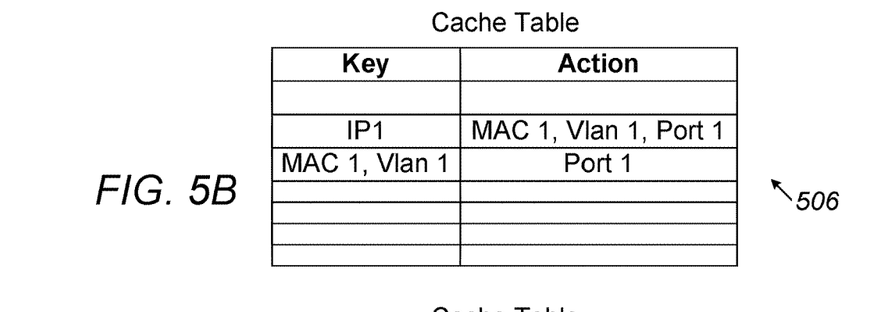
FIG. 5B is a table that schematically describes the contents of a local cache prior to the change of the forwarding rule, in accordance with an embodiment of the present invention.
Figure 5C:
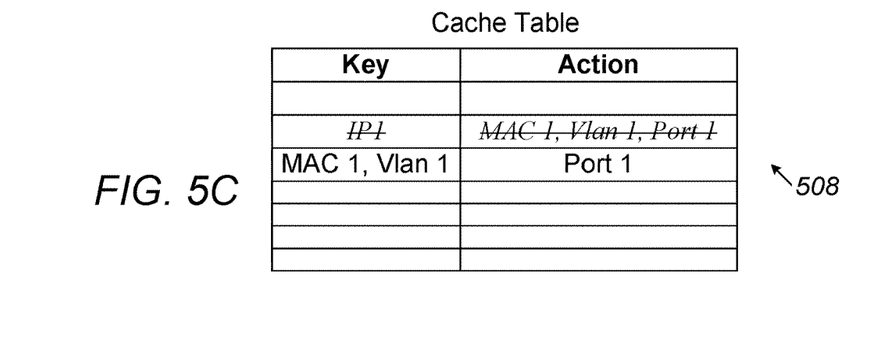
FIG. 5C is a table that schematically describes the contents of a local cache after a selective flush, in accordance with an embodiment of the present invention.

In the example illustrated in FIGS. 5A, 5B and 5C, the IP1 entry in IP Routing Table 500 and the ECMP A entry of ECMP table 502 are updated, but the {MAC[1],Vlan[1]} entry of Table 504 remains valid.

FIG. 5B is a table that schematically describes the contents 506 of a local cache prior to the change of the forwarding rule. The table comprises two entries—an IP[1] entry, which returns {MAC[1],Vlan[1],Port[1]}; and a {MAC[1],Vlan[1]} entry, which returns Port[1]. The entries of table 506 are mirror copies of entries in the forwarding table.

FIG. 5C is a table that schematically describes the contents 508 of the local cache after a selective flush. The entry of IP1 is flushed-out, as the rule for this flow has changed, but the entry for {MAC[1],Vlan[1]} remains unchanged.

Thus, according to the example embodiment illustrated in FIGS. 5A, 5B and 5C, when entries in the forwarding table that are associated with a flow of IP Lookup that has a source address IP1 are invalidated in the forwarding table, the corresponding entries in the cache table are invalidated, but other entries remain valid, and can be used to process subsequent packets.

As would be appreciated, the structure of the forwarding table and the cache table described above is cited by way of example. In alternative embodiments, other table structures may be used, including, for example, multi-level cache tables and a distributed forwarding table.

The configuration of Network Switch 100, Control-Plane Processing 116, Control Plane 200, Ingress Processors 208, 308, 408, local caches 214, 314, 414, and forwarding table 114, including all units thereof and including the contents of the forwarding and cache tables, shown in FIGS. 1 through 5, are example configurations that are shown purely for the sake of conceptual clarity. Any other suitable configurations can be used in alternative embodiments.

In various embodiments, the various tasks associated with flushing entries of local caches may be carried out by various elements of the control plane. These elements are referred to herein collectively as "cache-flushing circuitry." The cache-flushing circuitry may comprise, for example, circuitry coupled to forwarding table 114, circuitry distributed among the ingress processors (e.g., progressive flush circuits 320, selective flush circuits 420 and cache control circuits 318 and 418), or both. Alternatively, any other cache-flushing circuitry configuration can be used.

The embodiments described herein refer mainly to network switches, by way of example. The disclosed techniques, however, can be used in various other types of network elements, such as in network routers.

In various embodiments, the different elements of Network Switch 100, Control-Plane Processing 116, Control Plane 200, Ingress Processors 208, 308, 408, local caches 214, 314, 414, and forwarding table 114, may be implemented using suitable hardware or firmware, such as one or more Application-Specific Integrated Circuits (ASIC) or Field-Programmable Gate Arrays (FPGA), or a combination of ASIC and FPGA. Alternatively, some elements of network processor 100 may be implemented in software, or using a combination of software, hardware and/or firmware elements.

Processor 112 of Network Switch 100 typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports, configured to serve as ingress and egress ports for receiving and transmitting packets from and to a network;
a memory, configured to store a forwarding table comprising rules that specify forwarding of the packets from the ingress ports to the egress ports;
multiple processors, configured to process the packets in accordance with the rules;
two or more cache memories, each configured to cache a respective copy of one or more of the rules, for use by the multiple processors; and
cache-flushing circuitry, configured to trigger flushing operations of copies of rules in the cache memories in response to changes in the forwarding table, and to reduce a likelihood of simultaneous accesses to the forwarding table for updating multiple cache memories, by diluting the flushing operations,
wherein the cache-flushing circuitry is configured to dilute the flushing operations by identifying one or more packet flows affected by the changes in the forwarding table, and flushing only copies of rules that pertain to the affected packet flows.

2. A method, comprising:
in a network element, receiving and transmitting packets from and to a network using multiple ports that serve as ingress and egress ports;
storing, in a memory, a forwarding table comprising rules that specify forwarding of the packets from the ingress ports to the egress ports;
processing the packets by multiple processors of the network element, in accordance with the rules;
caching a respective copy of one or more of the rules in each of two or more cache memories, for use by the multiple processors; and
triggering flushing operations of copies of rules in the cache memories in response to changes in the forwarding table, and reducing a likelihood of simultaneous accesses to the forwarding table for updating multiple cache memories, by diluting the flushing operations,
wherein said diluting the flushing operations comprises identifying one or more packet flows affected by the changes in the forwarding table, and flushing only copies of rules that pertain to the affected packet flows.

3. A method, comprising:
in a network element, receiving and transmitting packets from and to a network using multiple ports that serve as ingress and egress ports;
storing, in a memory, a forwarding table comprising rules that specify forwarding of the packets from the ingress ports to the egress ports;
processing the packets by multiple processors of the network element, in accordance with the rules;
caching a respective copy of one or more of the rules in each of two or more cache memories, for use by the multiple processors; and
triggering flushing operations of copies of rules in the cache memories in response to changes in the forwarding table, and reducing a likelihood of simultaneous accesses to the forwarding table for updating multiple cache memories, by de-correlating the flushing operations,
wherein said de-correlating the flushing operations comprises gradual invalidation of entries in the cache memories.

4. The method according to claim 2, wherein said processing the packets by multiple processors comprises:
when a copy of a rule is found by a processor in a cache memory, using the copy of the rule that is found by said processor in said cache memory; and
when a copy of the rule is not found by the processor in the cache memory, using a rule in the forwarding table stored in the memory.

5. The method according to claim 3, wherein said processing the packets by multiple processors comprises:
when a copy of a rule is found by a processor in a cache memory, using the copy of the rule that is found by said processor in said cache memory; and
when a copy of the rule is not found by the processor in the cache memory, using a rule in the forwarding table stored in the memory.

6. A network element, comprising:
multiple ports, configured to serve as ingress and egress ports for receiving and transmitting packets from and to a network;
a memory, configured to store a forwarding table comprising rules that specify forwarding of the packets from the ingress ports to the egress ports;
multiple processors, configured to process the packets in accordance with the rules;

two or more cache memories, each configured to cache a respective copy of one or more of the rules, for use by the multiple processors; and cache-flushing circuitry, configured to trigger flushing operations of copies of rules in the cache memories in response to changes in the forwarding table, and to reduce a likelihood of simultaneous accesses to the forwarding table for updating multiple cache memories, by de-correlating the flushing operations, wherein said de-correlating the flushing operations comprises gradual invalidation of entries in the cache memories.

7. The network element according to claim 1, wherein said multiple processors are configured to process the packets according to the rules, at least in part by:

when a copy of a rule is found by a processor in a cache memory, using the copy of the rule that is found by said processor in said cache memory; and when a copy of the rule is not found by the processor in the cache memory, using a rule in the forwarding table stored in the memory.

8. The network element according to claim 6, wherein said multiple processors are configured to process the packets according to the rules, at least in part by:

when a copy of a rule is found by a processor in a cache memory, using the copy of the rule that is found by said processor in said cache memory; and when a copy of the rule is not found by the processor in the cache memory, using a rule in the forwarding table stored in the memory.

9. The network element according to claim 5, wherein the cache-flushing circuitry is configured to de-correlate the flushing operations by applying the flushing operations at a rate that does not exceed a predefined rate threshold.

10. The network element according to claim 5, wherein the cache-flushing circuitry is configured to de-correlate the flushing operations by enforcing at least a predefined time interval between successive flushing operations.

11. The method according to claim 3, wherein de-correlating the flushing operations comprises applying the flushing operations at a rate that does not exceed a predefined rate threshold.

12. The method according to claim 3, wherein de-correlating the flushing operations comprises enforcing at least a predefined time interval between successive flushing operations.

\* \* \* \* \*